Aug. 6, 1957     F. N. MARIANI     2,801,767
TANK CAP
Filed May 2, 1955     3 Sheets-Sheet 1

INVENTOR.
Frank N. Mariani
BY
*Em Palmer*
ATTORNEY

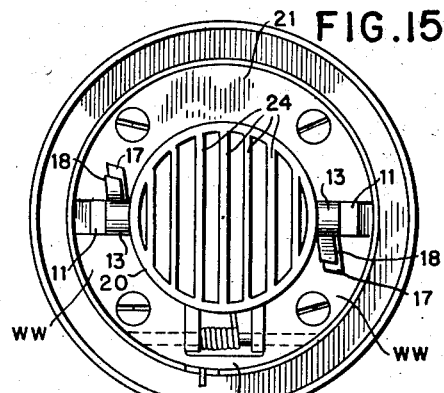

Aug. 6, 1957 F. N. MARIANI 2,801,767
TANK CAP
Filed May 2, 1955 3 Sheets-Sheet 3
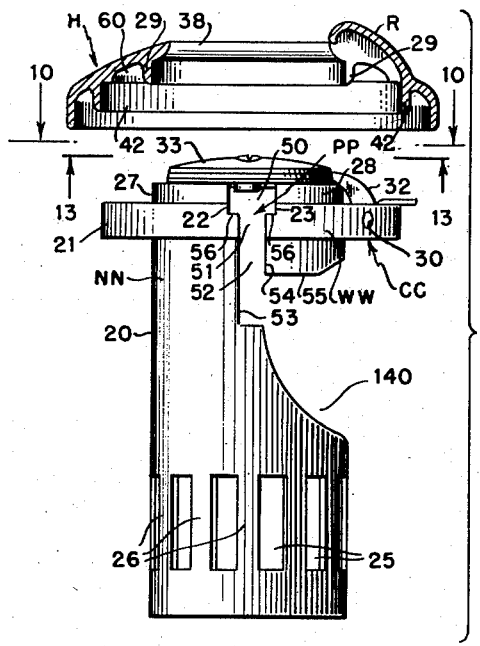
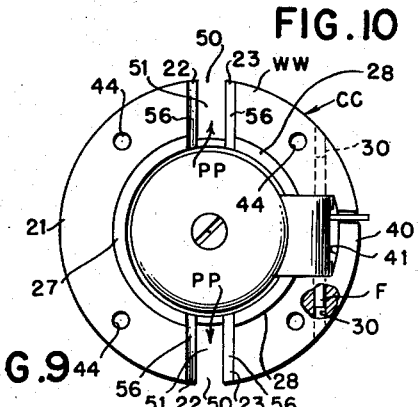
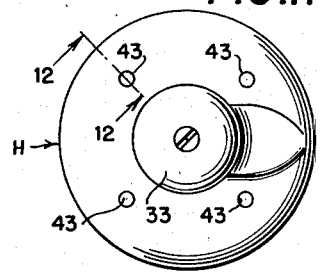
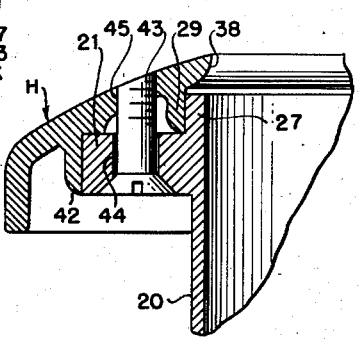
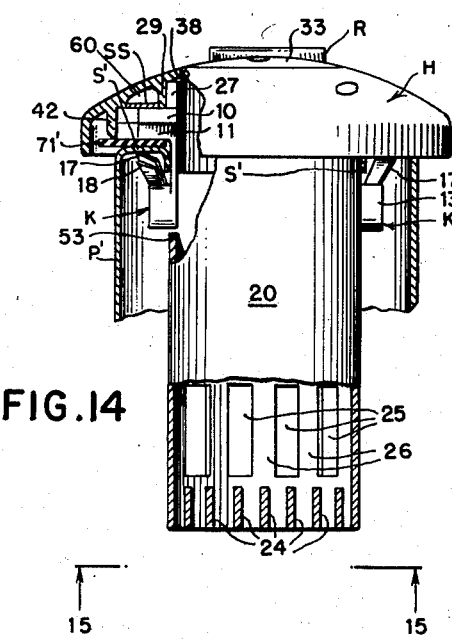
INVENTOR.
Frank N. Mariani
BY
*Em Palmer*
ATTORNEY

United States Patent Office 2,801,767
Patented Aug. 6, 1957

2,801,767
TANK CAP
Frank N. Mariani, New York, N. Y.
Application May 2, 1955, Serial No. 505,135
12 Claims. (Cl. 220—86)

The subject matter of this invention is a novel tank cap for a liquid conducting pipe rising from a fluid receiving tank of the type employed in a self-propelled vehicle. One object of the invention is realized in the provision of a universal tank cap having means for converting the cap for clamping thereof in sealtight fashion either against an inwardly overhanging or an outwardly overhanging interrupted channel shaped seat of the pipe. Another object is concerned with the provision of reversible and spaced spring carrying keys adapted to be mounted on the cap to permit the latter to be retained against either the inwardly or outwardly overhanging seat of the fluid conducting pipe. Another object resides in the provision of a hinged self-closing closure adapted to be operated by a fluid issuing nozzle to a position within the shell of the cap to prevent interference with the liquid dispensed into the shell from the nozzle. Another important object resides in the provision of a tank cap wherein the dome shaped head thereof carries downwardly extending and diametrically spaced keys or lugs straddling the shell of the cap and adapted to straddle the liquid conducting pipe of the tank whereby the biased leaf springs carried by the keys serve to grip the underface of the outwardly overhanging channel shaped seat for clamping and holding the cap firmly against the seat. Specifically a further object is concerned with an improved cap wherein a dome shaped head includes a nozzle receiving orifice held closed and sealed by a normally raised spring controlled closure and wherein an upper rim portion of a shell above a reduced neck of the latter is appropriately nested within the head and has a laterally extending substantially semi-circular flange below the rim portion but overhanging the neck although nested within and retained by the head for cooperating with a substantially semi-circular segment which is above a relatively deep cutaway portion of the shell and is free of, spaced from and substantially complementary to the flange and nested within and also retained by the head to define with the flange an interrupted annular member, the flange and segment having diametrically arranged but spaced ends defining guide means for non-rotatably receiving and supporting rectangular upper parts of spaced keys which include depending spaced legs straddling the shell and comprising keeper means for retaining biased leaf spring means to cooperate with the under face of the channel shaped seat to maintain the cap thereon.

Other salient objects, features and advantages will be apparent from the following specification considered in the light of the accompanying drawings wherein:

Fig. 7 is a side view of the tank cap substantially on the bent line 7—7 of Fig. 2.

Fig. 8 is a view substantially similar to Fig. 2 however showing the pivoted door of the vehicle open and the spring controlled closure depressed by the fluid conducting nozzle inserted in the tank cap.

Fig. 9 is an exploded and in part sectional view of the tank cap illustrating the shell spaced from the arcuate segment or closure carrier.

Fig. 10 is a plan view of the shell and the closure carrier taken on the line 10—10 of Fig. 9.

Fig. 11 is a plan view of the tank cap taken on the line 11—11 of Fig. 2 but on a smaller scale.

Fig. 12 is an enlarged sectional view on the line 12—12 of Fig. 11.

Fig. 13 is a bottom plan view of the head of the tank cap taken on the line 13—13 of Fig. 9.

Fig. 14 is an elevational view of the tank cap shown partly broken away and in section, illustrating the spaced spring carrying keys reversed and cooperating with an inwardly channel shaped overhanging seat of the fluid conducting pipe.

Fig. 15 is a view taken on the line 15—15 of Fig. 14.

Fig. 16 is a fragmentary perspective view of the fluid conducting pipe shown in Fig. 15 and illustrating the inwardly overhanging interrupted channel shaped seat.

Fig. 16A is a fragmentary perspective view of the tank cap shown in Fig. 14 to illustrate the coaction of the keeper of a key against its stop on completion of the closing of the cap.

Fig. 16B is a plan view of the gasket shown in Fig. 14, and

Fig. 17 is a fragmentary and broken perspective view of the tank cap showing the closure carrying means spaced from overhanging flange of the shell and defining therewith guide means for the reversible spring carrying keys.

Figure 1:
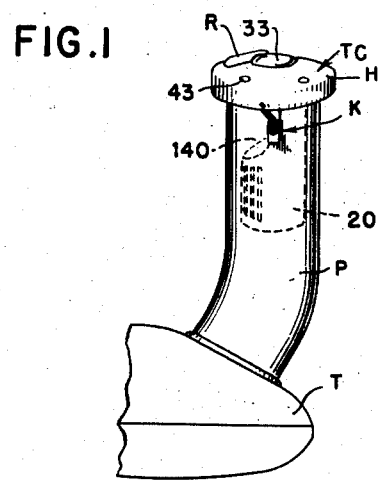
Fig. 1 is a perspective view of my tank cap however shown closed and mounted on the upper part of a liquid conducting pipe projecting from the upper part of liquid holding tank.
Figure 4:
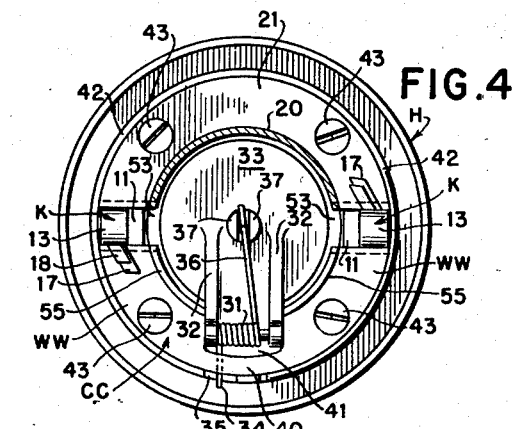
Fig. 4 is a horizontal sectional view on the line 4—4 of Fig. 3.

In the drawings, the tank cap generally designated TC is adapted to be removably clamped to the outwardly overhanging channel shaped seat S (Fig. 6) of the liquid conducting pipe P extending from the liquid storage tank T (Fig. 1) of a suitable self-propelled vehicle not shown, or the cap TC may be appropriately clamped to an inwardly overhanging channel shaped seat S' (Fig. 16) of an equivalent liquid conducting pipe P' also rising from a liquid storage tank. In other words, the herein tank cap may be readily converted to be effectively retained against various types of pipes. The retaining means takes the form of a pair of slidably guided keys each broadly designated K.

The keys K employed are identical each having a rectangular shaped part 10, a depending reduced leg 11 interrupted by a relief opening 12 and a lower keeper portion 13 interrupted by a slot 14 in which lower parts of companion leaf springs 15 and 16 are frictionally held in juxtaposition. Free terminals 17 and 18 of these springs are biased or slope relative to respective lower parts thereof although terminal 17 extends beyond terminal 18, the latter serving to back up the longer terminal 17. Each key K may be considered as substantially T-shaped spring carrying means for retaining the tank cap in a fixed position on fluid conducting pipe or riser P or P'.

Complementary guide means is provided for slidably directing spaced keys towards or away from each other to compensate for various sizes of fluid conducting pipes to which the convertible tank cap according to the invention may be clamped. To this end, an annular shell broadly designated 20 and a closure carrier CC are provided. More specifically shell 20 is formed with an overhanging arcuate flange 21 appropriately rabbeted to provide at each end thereof a guide recess 22. Closure carrier CC may be considered as an arcuate segment complementary to flange 21 but spaced therefrom although having its ends rabbeted to form the alined recesses 23 which oppose the companion alined recesses 22 of flange 21. The walls of the recesses 22 and 23 cooperate to slidably and closely guide the T-shaped keys K radially relative to shell 20. Stated in another way, flange 21 outwardly overhangs the body of shell 20 and closure carrier CC likewise outwardly overhangs the body of shell 20, although independent of each other, are nevertheless complementary to one another in the sense that both define an interrupted annular member for radially guiding the spring carrying keys K.

Shell 20 in fact is in the form of a cylindrical tube having at its bottom a grill comprising spaced parallel bars 24 to prevent undesirable large objects to reach storage tank T and for a similar purpose the cylindrical tubular body of the shell is interrupted by the horizontally spaced vertically arranged slots 25 to form the circumferentially spaced baffles 26.

Extending upwardly from flange 12 is the substantially semi circular rim 27 and spaced therefrom are the spaced circular lips 28 projecting upwardly from closure carrier CC. The semi circular rim 27 and the spaced lips 28 constitute interrupted annular rim means closely nested or fitting within the interrupted annular rib 29 depending from the dome shaped head H of the tank cap TP.

Figure 5:
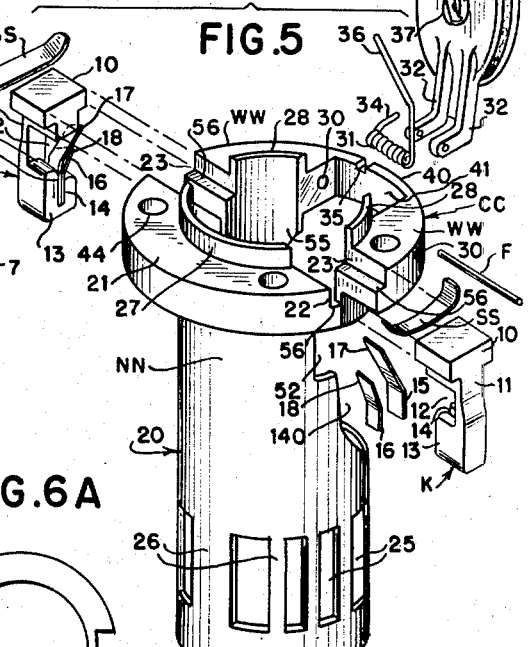
Fig. 5 is an exploded and perspective view of the parts of the tank cap except for the head thereof.

Fulcrum pin F is effectively retained in spaced openings 30 of opposing parts or wings WW (Figs. 5 and 10) of closure carrier CC. This pin is surrounded by the helical spring 31 and also pivotally supports the perforated and offset arms or elbows 32 of the frusto-conical closure generally denoted 33. Spring 31 has a short terminal 34 retained in notch 35 in bridge 40 of closure carrier CC and has a long terminal retained between spaced lugs 37 of closure 33 which effectively fits into and seals opening or orifice 38 at the top part of head H, the arrangement being such that spring 31 is wound up and tensioned when closure 33 is swung downwardly into the shell to be arranged deep within the cutaway portion or opening 140 interrupting the intermediate part of shell 20. After door D is pivotally raised, closure 33 may be manually pivoted downwardly or automatically by a nozzle N (shown in dash and dot lines in Fig. 8) of a fluid conducting supply line. Nozzle N thus displaces closure 33 so that it will not interfere or obstruct the fluid issuing into the cap. During removal of the nozzle from within the shell, spring 31 recoils to automatically elevate spring terminal 36, thereby swinging arms 32 upwardly whereby closure 33 adequately closes orifice 38. Closure 33 to insure proper sealing against the wall of orifice 38 is provided with a suitable washer 39.

Wings WW of closure carrier CC are integrally connected by the arcuate bridge 40 and form with the latter recess 41 in which arms 33 may be swung. Closure carrier CC and segment or flange 21 although spaced from each other define an interrupted ring shaped member closely received within annular rib 42 which depends from the top wall of head H and is spaced from but concentric with the depending annular rib 29, the latter serving as a stop to limit insertion of flange 21 and closure carrier CC within the interrupted rib 42. The diametrically disposed and spaced keys K may be said to be carried by the dome shaped head H as the flange 21 and closure carrier CC are carried by head H. For this purpose, screws 43 projecting through locating openings 44 in wings WW and flange 21 threadably coact with the threaded bores 45 in head H as is well understood.

The walls of companion recesses 22 and 23 (Figs. 9 and 10) form spaced and diametrically disposed passageways PP having expanded upper parts 50 and reduced lower parts 51 which lead into gaps 52 defined by walls of reentrant notches 53 interrupting the upper part or reduced neck NN of shell 20 and by walls 54 of spaced arcuate guides 55 depending from closure carrier CC. Guides 55 serve to limit tilting of nozzle N when inserted into shell 20.

Expanded parts 50 of passageways PP non-rotatably receive and slidably guide the rectangular top portions 10 of the T-shaped keys K. These top portions 10 are seated on aligned shoulders 56 formed by the expanded parts 50 and the communicating reduced potrions 51. Legs 11 of the T-shaped keys K are guided by the walls of the reduced parts 51.

Slightly arched leaf springs SS are positioned within the annular groove 60 of head H (Figs. 1, 3, 5 and 8) and cooperate with top portions 10 of the keys to hold the latter against the shoulders 56.

Figure 3:
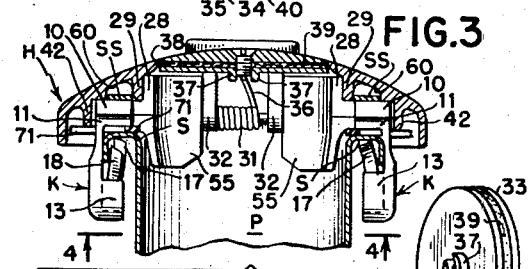
Fig. 3 is a sectional view on the line 3—3 of Fig. 2.
Figure 6:
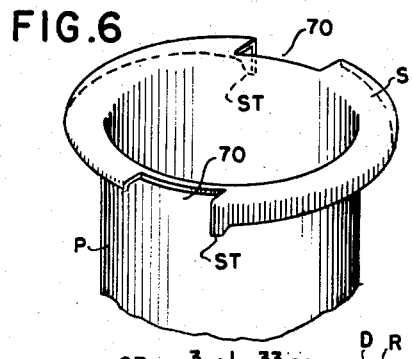
Fig. 6 is a fragmentary perspective view of the upper part of the liquid conducting pipe having an annular interrupted outwardly overhanging channel shaped seat.
Figure 2:
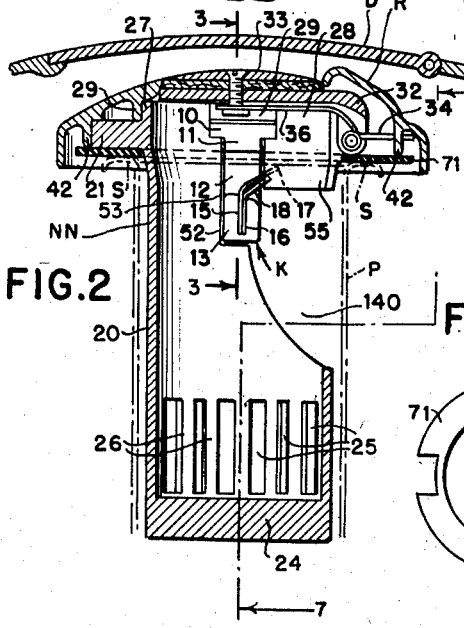
Fig. 2 is an enlarged vertical sectional view of the tank cap shown in Fig. 1, but rendered inaccessible by a swingable door spaced above the cap and carried by one of the rear fenders of a self-propelled vehicle.
Figure 6A:
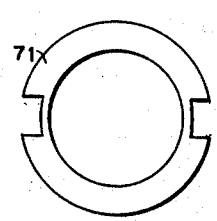
Fig. 6A is a plan view of the gasket employed with the channel shaped seat shown in Fig. 6.

According to the invention and as previously stated, the keys are severally adapted to cooperate with a fluid conducting pipe having either an outwardly overhanging channel shaped seat as shown in Fig. 6 or an inwardly overhanging seat as shown in Fig. 16. Where the keys K are to be retained against an outwardly overhanging seat S, the keys K are so arranged that their spring holding keepers 13 face towards shell 20 or pipe P (Fig. 3). When the keys K are employed with an inwardly overhanging seat S' of pipe P', keepers 13 of keys K face away from shell 20 (Fig. 17).

With head H secured to shell 20 and to closure carrier CC, the keys may be assembled therewith promptly but before such assembly the type of fluid conducting pipe is first ascertained. Thereafter the keys or spring holders K are inserted through slots or gaps 52 and shifted outwardly and radially into the passageways PP to be seated on shoulders 56 against the resistance of the spaced spring means SS. In such relation the spaced keys straddle the fluid receiving shell 20.

By the present invention, the cap employed may be readily converted for various types of fluid conducting pipes. This is accomplished by merely rotating the keys about their long axis 180 degrees before assembly with the shell 20 and the complementary closure carrier CC and after such complete assembly the tank cap can be conveniently mounted on a particular type of fluid conducting pipe. For example, the tank cap without any keys may be used as a stock unit for many types of automobiles and after having determined the type of tank pipe employed, the keys are then properly mounted on the tank caps. In the case of the outwardly overhanging seat S shown in Fig. 6, this seat is provided with suitable diametrically arranged gaps 70 to receive legs 11 of spring holding keys K now having their keepers 13 facing the shell. Thereafter, the tank cap is dropped onto the annular gasket 71 formerly positioned on seat S. Now by rotating the cap, terminals 17 and 18 of the biased leaf springs carried by the keys come under the interrupted seat S and terminals 17 bear against the latter. Such rotation however is limited by stops ST, that is, the high parts 100 of keepers 13 ride against stops ST at which time spring terminals 17 grip seat S and maintain the cap in its set position against stops ST and against backing away therefrom. If the tank cap be converted to cooperate with the inwardly overhanging seat S', the keys are mounted on the cap so that their keepers face outwardly as shown in Fig. 17. Subsequently the tank cap is dropped onto washer 71' adapted to be arranged on seat S' and legs 12 of the keys are projected into relief openings 70'. The cap is now rotated relative to pipe P' and the high parts 100 of the keeper coact with stops ST' while springs 17 act to retain the keys against stop ST and consequently the tank cap in a set and clamped position. In all forms disclosed, the keys although straddling shell 20, actually are carried by head H in that the guide means therefor, namely, carrier CC and flange 21, are carried by head H having nozzle rest R.

Various changes may be made in details of construction and arrangement of parts without departing from the scope of the invention or sacrificing any of the advantages thereof inherent therein.

I claim:

1. A tank cap for cooperating with an overhanging channel shaped seat of a liquid conducting pipe and adapted to receive liquid issuing from a nozzle; comprising, a shell including a cylindrical body having a plurality of vertically arranged and spaced bars and including a relatively large vertical relief opening, a head overhanging said body and carrying said shell and having a centrally arranged orifice, swingable means having a closure normally covering said orifice and adapted to be depressed downwardly by said nozzle into said shell and relief opening to preclude interference by said swingable means and closure to said liquid issuing from said nozzle during discharge of said liquid into said shell, spring means cooperating with said closure to normally hold the latter within said orifice, spaced keys independent of said shell extending downwardly from within said head and comprising spaced upper portions including spaced depending legs having spaced keepers, means carried by said head for retaining said upper portions to maintain said legs and keepers near spaced sides of said shell, and biased resilient means retained by said keys for clamping against the underface of said seat.

2. A tank cap for cooperating with an overhanging channel shaped seat of a liquid conducting pipe and adapted to receive liquid issuing from a nozzle; comprising, a shell including a cylindrical body having a plurality of vertically arranged and spaced bars and including a relatively large vertical relief opening, a head outwardly overhanging said body and carrying said shell and having a centrally arranged orifice, swingable means having a closure normally covering said orifice and adapted to be depressed downwardly by said nozzle into said shell and relief opening to preclude interference by said swingable means and closure to said liquid issuing from said nozzle during discharge of said liquid into said shell, spring means cooperating with said closure to normally hold the latter elevated within said orifice, spaced keys independent of said shell comprising spaced depending legs including upper portions extending laterally of said legs and having spaced keepers, biased resilient means retained by said keys for clamping against the underface of said seat and means carried by said head for retaining said upper portions within said head to maintain said legs and keepers near the sides of said shell.

3. A tank cap for cooperating with an overhanging channel shaped seat of a liquid conducting pipe and adapted to receive liquid issuing from a nozzle; comprising, a head having an orifice, a shell carried by said head, depressible spring controlled closure means for said orifice, spaced keys independent of said shell extending downwardly from within said head and comprising spaced upper portions including spaced depending legs having spaced keepers, means carried by said head for retaining said upper portions to maintain said legs and keepers near spaced sides of said shell, and biased spring means retained by said keepers for clamping against the underface of said seat.

4. A tank cap for cooperating with an overhanging channel shaped seat of a liquid conducting pipe and adapted to receive said liquid issuing from a nozzle; comprising, a head having an orifice, a shell carried by said head, depressible spring controlled closure means for said orifice, spaced keys independent of said shell comprising spaced depending legs having spaced keepers including upper portions extending laterally of said legs, means carried by said head for retaining said upper portions within said head to maintain said legs and keepers near the sides of said shell, and biased spring means retained by said keepers for clamping against the underface of said seat.

5. A tank cap for cooperating with an overhanging channel shaped seat of a liquid conducting pipe and adapted to receive liquid issuing from a nozzle; comprising, a head having an orifice, a shell carried by said head, depressible spring controlled closure means for said orifice, spaced keys independent of said shell straddling said shell and comprising spaced depending legs spaced from said shell having spaced keepers spaced from said shell, means carried by said head for holding said keys to maintain said legs and keepers spaced from and straddling said shell, and biased spring means retained by said keeper for clamping against the underface of said seat.

6. A tank cap for cooperating with an overhanging channel shaped seat of a liquid conducting pipe and adapted to receive liquid issuing from a nozzle; comprising, a head having an orifice, a shell carried by said head, depressible spring controlled closure means for said orifice, spaced keys independent of said shell extending from within said head and straddling said shell and comprising spaced depending legs spaced from said shell and having spaced keepers spaced from said shell, said keys having upper portions extending laterally of said legs, means carried by said head for retaining said upper portions within said head to maintain said legs and keepers spaced from and straddling said shell, and biased spring means retained by said keepers for clamping against the underface of said seat.

7. A tank cap for cooperating with an overhanging channel shaped seat of a liquid conducting pipe and adapted to receive liquid issuing from a nozzle; comprising, a head having an orifice to receive said nozzle, a shell carried by said head and having a laterally extending and arcuate flange; arcuate carrying means free of, spaced from and substantially complementary to said flange and carried by said head to define with said flange an interrupted substantially annular member, spring controlled closure means pivotally carried by said carrying means to normally hold said orifice closed, said flange and carrying means defining guide means, keys having upper parts receivable in said guide means and having lower parts straddling said shell and comprising keeper means, and biased resilient means retained by said keeper means for cooperating with said seat.

8. A tank cap for cooperating with an overhanging channel shaped seat of a liquid conducting pipe and adapted to receive liquid issuing from a nozzle; comprising, a head having an orifice to receive said nozzle, a shell carried by said head and having a laterally extending flange; a segment free of, spaced from and substantially complementary to said flange and carried by said head to define with said flange an interrupted substantially annular member, spring controlled closure means pivotally carried by said segment to normally hold said orifice closed, said flange and segment defining guide means, keys having upper parts receivable and held in said guide means and having lower parts straddling said shell and comprising keeper means, and biased resilient means retained by said keeper means for cooperating with said seat.

9. A tank cap for cooperating with an overhanging channel shaped seat of a liquid conducting pipe and adapted to receive liquid issuing from a nozzle; comprising, a head having an orifice to receive said nozzle, a shell carried by said head and having a laterally extending flange; a segment free of, spaced from and substantially complementary to said flange and carried by said head to define with said flange an interrupted substantially annular member, depressible spring controlled closure means pivotally carried by said segment to normally hold said orifice closed, said flange and segment having spaced ends defining guide means, keys having upper parts held in said guide means and having lower parts straddling said shell and comprising keeper means, and biased resilient means retained by said keeper means for cooperating with said seat.

10. A tank cap for cooperating with an overhanging channel shaped seat of a liquid conducting pipe and adapted to receive a liquid issuing from a nozzle; comprising, a head having an orifice to receive said nozzle, a shell carried by said head and having a laterally extending arcuate flange; an arcuate segment free of, spaced from and substantially complementary to said flange and carried by said head to define with said flange an interrupted substantially annular member, depressible spring controlled closure means pivotally carried by said segment to normally hold said orifice closed, said flange and segment defining T-shaped guide means, keys having T-shaped upper parts receivable in said guide means and having legs straddling said shell and comprising keeper means, and biased resilient means retained by said keeper means for cooperating with said seat.

11. A tank cap for cooperating with an overhanging channel shaped seat of a liquid conducting pipe and adapted to receive liquid issuing from a nozzle; comprising, a head having an orifice to receive said nozzle, a shell carried by said head and having a laterally extending flange; a segment free of, spaced from and substantially complementary to said flange and carried by said head to define with said flange an interrupted substantially annular member, normally raised spring controlled closure means pivotally carried by said segment to normally hold said orifice closed, said flange and segment having spaced ends defining substantially T-shaped slots comprising upper expanded parts and lower reduced parts communicating with said expanded parts and forming alined shoulders, keys having T-shaped heads receivable in said slots and seated on said shoulders and having spaced legs outside of said shell and comprising keeper means, and biased resilient means retained by said keeper means for cooperating with said seat.

12. A tank cap for cooperating with an overhanging channel shaped seat of a liquid conducting pipe and adapted to receive a liquid from a nozzle; comprising a head having an orifice to receive said nozzle and having depending spaced inner and outer annular ribs, a cylindrical shell embodying a neck portion provided with a reentrant recess and a relatively deep cutaway portion below and in communication with said recess, said shell having a laterally extending flange overhanging said neck; a segment free of, spaced from and substantially complementary to said flange to define with said flange an interrupted substantially annular member closely receivable within said outer rib, spring controlled closure means pivotally carried by said segment to normally hold said orifice closed, said flange and segment defining spaced guide means, keys having upper parts receivable in said guide means and having lower parts straddling said shell and comprising keeper means, biased resilient means retained by said keeper means for cooperating with said seat, said member having spaced arcuate lips extending upwardly from said segment and a rim extending upwardly from said flange, said rim and lips defining interrupted rim means, and means holding said segment and flange to said head.

References Cited in the file of this patent
UNITED STATES PATENTS

| | | |
|---|---|---|
| 2,038,003 | Ritz-Woller | Apr. 21, 1936 |
| 2,345,809 | Greenberg | Apr. 4, 1944 |
| 2,597,014 | Mariani | May 20, 1952 |
| 2,695,161 | Lebus | Nov. 23, 1954 |